US007010881B2

(12) United States Patent
Altman

(10) Patent No.: US 7,010,881 B2
(45) Date of Patent: Mar. 14, 2006

(54) FISHING LURE AND METHOD OF MANUFACTURE

(76) Inventor: Jeremy W. Altman, 307 Commerce Dr., Suite C, Martinez, GA (US) 30907

(*) Notice: Subject to any disclaimer, the term of this patent is extended or adjusted under 35 U.S.C. 154(b) by 0 days.

(21) Appl. No.: 10/824,991

(22) Filed: Apr. 15, 2004

(65) Prior Publication Data

US 2005/0229473 A1 Oct. 20, 2005

(51) Int. Cl.
*A01K 85/10* (2006.01)
*A01K 85/00* (2006.01)

(52) U.S. Cl. .................................... 43/42.13; 43/42.14

(58) Field of Classification Search ............... 43/42.11, 43/42.13, 42.14, 42.15, 42.16, 42.17, 42.19, 43/42.36, 42.4, 42.42

See application file for complete search history.

(56) References Cited

U.S. PATENT DOCUMENTS

| | | | | | |
|---|---|---|---|---|---|
| 1,583,199 | A | * | 5/1926 | Taylor | 43/42.42 |
| 1,606,877 | A | * | 11/1926 | Alonzo | 43/42.4 |
| 1,645,644 | A | * | 10/1927 | Davenport | 43/42.4 |
| 1,923,840 | A | * | 8/1933 | Ozburn | 43/42.13 |
| 2,125,030 | A | * | 7/1938 | Ozburn | 43/42.13 |
| 2,549,458 | A | * | 4/1951 | Grimm | 43/42.13 |
| 2,572,721 | A | * | 10/1951 | Hatt | 43/42.19 |
| 2,612,715 | A | * | 10/1952 | Wadlington et al. | 43/42.4 |
| 2,621,437 | A | * | 12/1952 | Pedranti | 43/42.19 |
| 2,948,079 | A | * | 8/1960 | Malchert | 43/42.4 |
| 3,093,923 | A | * | 6/1963 | Jackson | 43/42.11 |
| 3,143,824 | A | * | 8/1964 | Thomas | 43/42.11 |
| 3,191,336 | A | * | 6/1965 | Cordell, Jr. | 43/42.24 |
| D215,090 | S | * | 9/1969 | Bruckner | 43/42.4 |
| 3,550,306 | A | * | 12/1970 | Heitman | 43/44.2 |
| 3,579,892 | A | * | 5/1971 | Olvey, Sr. | 43/42.11 |
| 3,611,614 | A | * | 10/1971 | Ward | 43/42.24 |
| 3,996,688 | A | * | 12/1976 | Hardwicke, III | 43/42.11 |
| 4,133,135 | A | * | 1/1979 | Miles | 43/42.13 |
| 4,209,932 | A | * | 7/1980 | Pate | 43/42.11 |
| 4,457,096 | A | * | 7/1984 | Wasson | 43/42.42 |
| 4,571,877 | A | * | 2/1986 | Montgomery | 43/42.13 |
| 4,742,639 | A | * | 5/1988 | Gunn | 43/42.13 |
| 4,777,758 | A | * | 10/1988 | Phillips | 43/43.2 |
| 4,793,089 | A | * | 12/1988 | Long et al. | 43/42.13 |
| 4,815,233 | A | * | 3/1989 | Pingel | 43/42.11 |
| 4,827,660 | A | * | 5/1989 | Dudeck | 43/42.11 |
| 4,864,766 | A | * | 9/1989 | Bohn | 43/42.37 |
| 4,884,358 | A | * | 12/1989 | Grove et al. | 43/42.13 |
| 4,901,470 | A | * | 2/1990 | Gentry | 43/42.13 |
| 5,092,073 | A | * | 3/1992 | Kaecker | 43/42.39 |
| 5,113,607 | A | * | 5/1992 | Pate | 43/42.36 |

(Continued)

FOREIGN PATENT DOCUMENTS

| | | | | |
|---|---|---|---|---|
| GB | 687010 A1 | * | 2/1953 | 43/43.12 |

(Continued)

*Primary Examiner*—Darren W. Ark

(57) ABSTRACT

The present invention provides a fishing lure containing a body with a hook secured to the body. The body contains two openings to secure two crimped sleeves into the opening. Two elongated arms are inserted and secured into the sleeves and extend outwardly and backwardly from the lure body. Spinning elements are attached to the distal ends of the elongated arms. A wire shank extends from the lure body to which a spinning element is attached to the distal end of the wire shank. The present invention is manufactured using a novel method comprising insertion of liquefied lure body material into the mold cavities of a mold forming piece, which contains impressions for the lure body, hooks, and sleeves. The mold forming piece is then spun in a centrifuge device.

9 Claims, 6 Drawing Sheets

U.S. PATENT DOCUMENTS

| | | | | | |
|---|---|---|---|---|---|
| 5,134,800 | A | * | 8/1992 | Sheehan et al. | 43/42.42 |
| 5,138,789 | A | * | 8/1992 | Hood | 43/42.13 |
| 5,216,830 | A | * | 6/1993 | Brott, II | 43/42.39 |
| 5,400,542 | A | * | 3/1995 | Johnson | 43/42.13 |
| 5,499,470 | A | * | 3/1996 | Reed | 43/42.13 |
| 5,505,015 | A | * | 4/1996 | Delricco | 43/42.13 |
| 5,596,831 | A | * | 1/1997 | McWethy, Jr. | 43/42.36 |
| 5,605,004 | A | * | 2/1997 | Boullt et al. | 43/42.13 |
| 5,617,667 | A | * | 4/1997 | Gonzalez | 43/42.36 |
| 5,930,941 | A | * | 8/1999 | Hayes, II et al. | 43/42.13 |
| 5,974,723 | A | * | 11/1999 | Taibi | 43/42.13 |
| 5,987,805 | A | * | 11/1999 | Laney | 43/42.13 |
| D418,898 | S | * | 1/2000 | Luckey | D22/131 |
| 6,601,336 | B1 | * | 8/2003 | Link | 43/42.13 |
| 2004/0074134 | A1 | * | 4/2004 | Morlen | 463/42.13 |

FOREIGN PATENT DOCUMENTS

| | | | | |
|---|---|---|---|---|
| JP | 2003-164239 | B1 | * | 6/2003 |
| JP | 2004-159633 | B1 | * | 6/2004 |

* cited by examiner

FISHING LURE AND METHOD OF MANUFACTURE

BACKGROUND OF THE INVENTION

1. Field of the Invention

This invention relates to a fishing lure and method of manufacturing of the same. In particular, the present invention relates to a fishing lure having elongated arms extending from the body of the fishing lure for attachment of spinning elements.

2. Summary of the Prior Art

Fishing lures with blades and other spinning elements attached are common in the art. These types of lures come in all different shapes, sizes, and configurations. Many such configurations disclose fishing lures with a hook extending from the tail-end of the body of the lure and a shank extending from the nose of the fishing lure with one or more spinning elements attached to the shank.

It is less common in the art to find fishing lures with spinning elements attached to arms extending from the sides of the body of the lure. However, such lures exist in the art. Examples of these types of lures include the following: U.S. Registration No. 1,923,840 and U.S. Registration No. 2,125,030 to Ozburn; U.S. Registration No. 3,996,688 to Hardwicke; U.S. Registration No. 4,884,358 to Grove; U.S. Registration No. 5,930,941 to Hayes; and U.S. Registration No. Des. 418,898 to Luckey.

The Ozburn patents disclose a lure with a body shaped like an insect, frog, or the like. A crossbar with eyelets at each end passes through the body of the lure such that the eyelets extend from each side of the body of the lure. A swinging lever with arms forming a W shape is mounted to the lure such that the arms pass through the eyelets on either side of the body of the lure. The arms extend backwards with swiveling blades attached to the arm's ends.

One embodiment of the Hardwicke patent reveals an angled wire that extends from the top of the lure with the swiveling blade attached at its distal end. The wire is imbedded in the body, which has a skirt attached to a sleeve that slips over the nose of the lure.

The Grove patent reveals a trio of spinners attached to wires extending from the body of the lure creating the appearance of a school of fish. One spinner is attached to an angled wire, which extends from the nose of the lure. Two other equal and opposite spinners are attached to wires that extend perpendicularly from the sides of the body at an upward angle.

The Hayes patent reveals a jig type lure. The lure body has deflectable arms, which extend from the sides of the lure body. The arms are stainless steel wire sufficiently stiff so they do not deflect when pulled through water, but also sufficiently flexible when engaged by the mouth of a fish. The wire ends are encapsulated within the lure body.

The Luckey design patent discloses a lure body with wires that extend from the sides of the lure body in a perpendicular manner. Additional wires are attached to each of the perpendicular wires at one end and swiveling blades are attached at the other end.

A patent to Miles, U.S. Registration No. 4,133,135, discloses a lure containing a body, skirt, a main wire extending from the nose of the body, two additional wires attached to the main wire at one end, and swiveling blades attached to the main wire at the other end.

A patent to Gentry, U.S. Registration No. 4,901,470, discloses a lure body having a skirt and bill that extends from the nose of the lure body. A cable wire with an attached spinner blade extends into the lure body through the head of the wire and an opening in the bill. The end of the cable wire is imbedded in the lure body. The cable wire is surrounded by a spring, which is partially imbedded in the lure body.

The present invention is different than the prior art. First, the prior art patents reveal rigid arms. The present invention describes both rigid and flexible wire arms and the advantages of the flexibility. Second, the wire arms of the prior art patents are imbedded within the lure body when the body of the lure is formed. In the present invention, the wire arms are attached by inserting them into tubular sleeves extending from the lure body. The lure body is formed first and the wire arms are attached afterwards. This invention is an improvement over prior art lures because it allows for the attachment of arms to the lure after the lure body has been formed and thereby allows for the selection of arms with different lengths and rigidity.

This invention also allows for a more efficient method of manufacture because the wire arms are inserted after the lure bodies are formed. The wire arms do not take up space in the mold forming piece during the forming process. Thus, more lure bodies can be formed with one mold forming piece.

SUMMARY OF THE INVENTION

It is an object of the present invention to provide a novel fishing lure containing elongated arms extending from sleeves secured into an openings on the lure body.

It is another object of the present invention to provide a novel fishing lure with crimped sleeves to secure the elongated arms within the sleeve.

It is another object of the present invention to provide arms that can be varied in length depending on the effect desired and can have spinners attached to attract fish.

It is another object of the present invention to provide a novel fishing lure with flexible elongated arms that bend when pulled through the water. The flexibility of the arms allows the lure to brush the bottom surface of a body of water without grabbing plants and debris. The flexibility also provides additional movement on the lure to attract fish.

It is another object of the present invention to provide a novel fishing lure with elongated arms extending from the lure body outwardly and backwardly.

It is another object of the present invention to provide a novel method of manufacturing the present invention using a mold forming piece. The mold forming piece contains impressions for the lure bodies, hooks, and shanks. Because the wire arms are added after the lures are created, space is not required for the lure arms in the mold forming pieces between each lure body impression. Therefore, more impressions can fit into one mold forming piece than current fishing lure manufacturing methods.

It is another object of the present invention to provide a novel method of manufacturing the present invention using a mold forming piece containing impressions for sleeves for insertion of elongated arms, which will extend from the lure body when formed.

It is another object of the present invention to provide a novel fishing lure that can be manufactured easily and inexpensively.

In satisfaction of these and related objectives, Applicant's present invention provides a fishing lure containing a body with a hook secured to the body. In the preferred embodiment, two sleeves are imbedded and extend from opposite sides of the body. Two elongated arms are inserted and secured within the sleeves and extend outwardly and backwardly from the lure body. Spinning elements are attached to the distal ends of the elongated arms. A wire shank extends from the lure body to which a spinning element is attached to the distal end of the wire shank. The preferred embodiment is manufactured using a novel method comprising insertion of liquefied lure body material into the mold cavities of a mold forming piece. While the mold forming piece is spun in a centrifuge device, sleeves, hooks and shanks are inserted into impressions in the mold cavities prior to pouring the liquefied lure body material. The liquefied material is allowed to cool and harden, thereby leaving the sleeves, hooks and shanks imbedded in and extending from the lure body.

DETAILED DESCRIPTION OF THE PREFERRED EMBODIMENT

Figure 1:
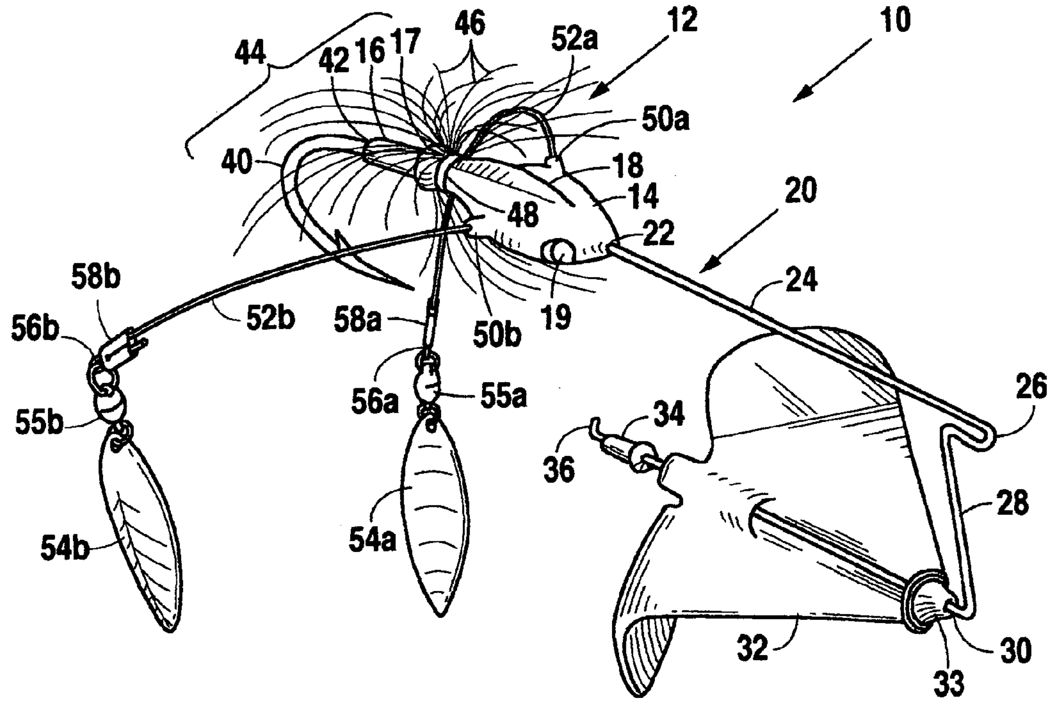
FIG. 1 is a perspective view of the preferred embodiment.

Referring to FIG. 1, the fishing lure 10 incorporates a body 12 having a head portion 14 and a tail portion 16. A lip 17 extends from and around the circumference of the tail portion 16. An elongated fin 18 protrudes from the top surface of the fishing lure and extends between the tail portion 16 and the head portion 14.

In the preferred embodiment, the fishing lure 10 is in the shape of a small bait fish with an eye 19 painted on or otherwise attached to the body. However, it is anticipated that the body 12 may resemble other shapes such as insects or frogs, which may be attractive to fish. In addition, it is preferred that the body be formed of cast lead. However, other acceptable materials may be substituted.

Figure 2:
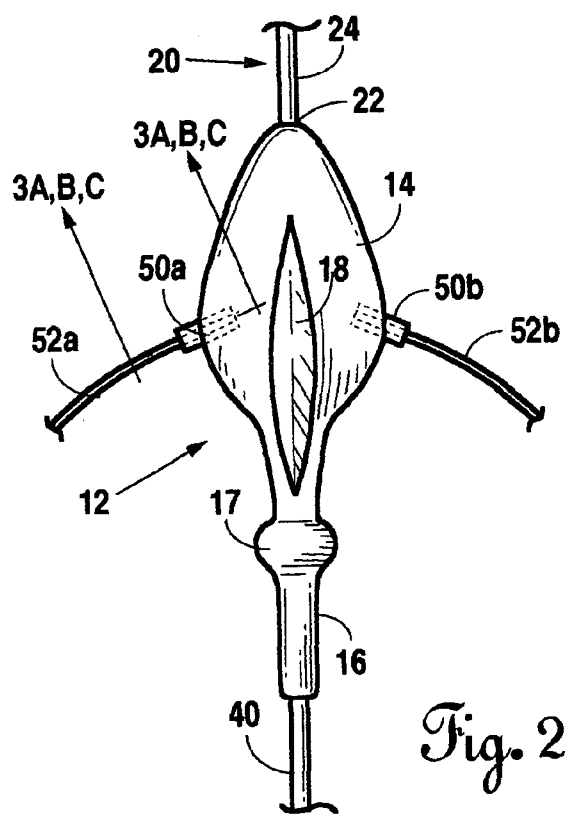
FIG. 2 is a top view of the preferred embodiment.

Referring to FIGS. 1 and 2, a shank 20 is embedded in and extends from the nose 22 of the body 12 of the fishing lure 10. As shown in FIG. 1, the shank 20 is bent to form a upper horizontal portion 24, a looped portion 26, a vertical portion 28, and a lower horizontal portion 30. The upper horizontal portion 24 extends from the nose 22 in a direction aligned with the body 12 of the fishing lure 10. The looped portion 26 is a small U-shaped curvature of the shank 20 which loops 180 degrees underneath the upper horizontal portion 24 in the same vertical plane. The vertical portion 28 extends downwardly from the lower end of the looped portion 26. The lower horizontal portion 30 extends from the lower end of the vertical portion 28 in a direction parallel to the upper horizontal portion 24 and inwardly generally toward the body 12. Although, in the preferred embodiment, the shank 20 is bent as described herein, it is anticipated that numerous configurations and shapes of the shank are acceptable.

Still referring to FIGS. 1 and 2, a propeller blade 32, commonly known in the art as a buzzbait blade, is rotatably mounted on the lower horizontal portion 30 of the shank 20. The propeller blade is positioned between a spacer 33 axially mounted to the lower horizontal portion 30 and end cap 34 axially mounted to the horizontal portion 30 toward its distal end 36. The distal end 36 is bent slightly to prevent the end cap 34 from sliding off the lower horizontal portion 30. Although the propeller blade 32 is utilized in the preferred embodiment, it is anticipated that other types of blades, such as spinnerbait blades, could be connected to or mounted on the shank 20.

Referring to FIG. 1, a hook 40 extends from the rearward tip 42 of the tail portion 16 of the body 12. A skirt 44 with a plurality of streamers 46 is attached to the tail portion 16 and positioned such that the streamers 46 will trail behind the fishing lure 10 and hide the hook 40 as the fishing lure 10 is pulled through water. In the preferred embodiment, the skirt 44 is attached to the tail portion 16 between the lip 17 and the head portion 14 with a rubber band 48. However, it is anticipated that other methods of attachment such as clipping or gluing are acceptable.

Referring to FIGS. 1, 2, and 3A–3C, rearwardly angled opposing connector sleeves 50*a* and 50*b* are embedded in and extend from the opposing sides of the head portion 14 of the body 12. Arms 52*a* and 52*b* are inserted into the connector sleeves 50*a* and 50*b* which are crimped around the arms 52*a* and 52*b* and thereby connecting and securing the arms 52*a* and 52*b* to the body 12. In the preferred embodiment, the arms 52*a* and 52*b* are flexible surflon multistrand nylon coated steel leader wire. However, it is anticipated that other flexible material such as nylon monofilament or an inflexible material such as single strand fixed wire could be used.

As shown in FIG. 1, spinner blades 54*a* and 54*b* are swivelly attached to the looped distal ends 56*a* and 56*b* of the arms 52*a* and 52*b* preferably with swivels 55*a* and 55*b*. Collars 58*a* and 58*b* are positioned around the looped distal ends 56*a* and 56*b* of the arms 52*a* and 52*b*. Collars 58*a* and 58*b* are flattened and pressed against the looped distal ends 56*a* and 56*b* to hold them in place. The collars 58*a* and 58*b* are positioned to leave the outermost portion of the looped distal ends 56*a* and 56*b* exposed.

Figure 4:
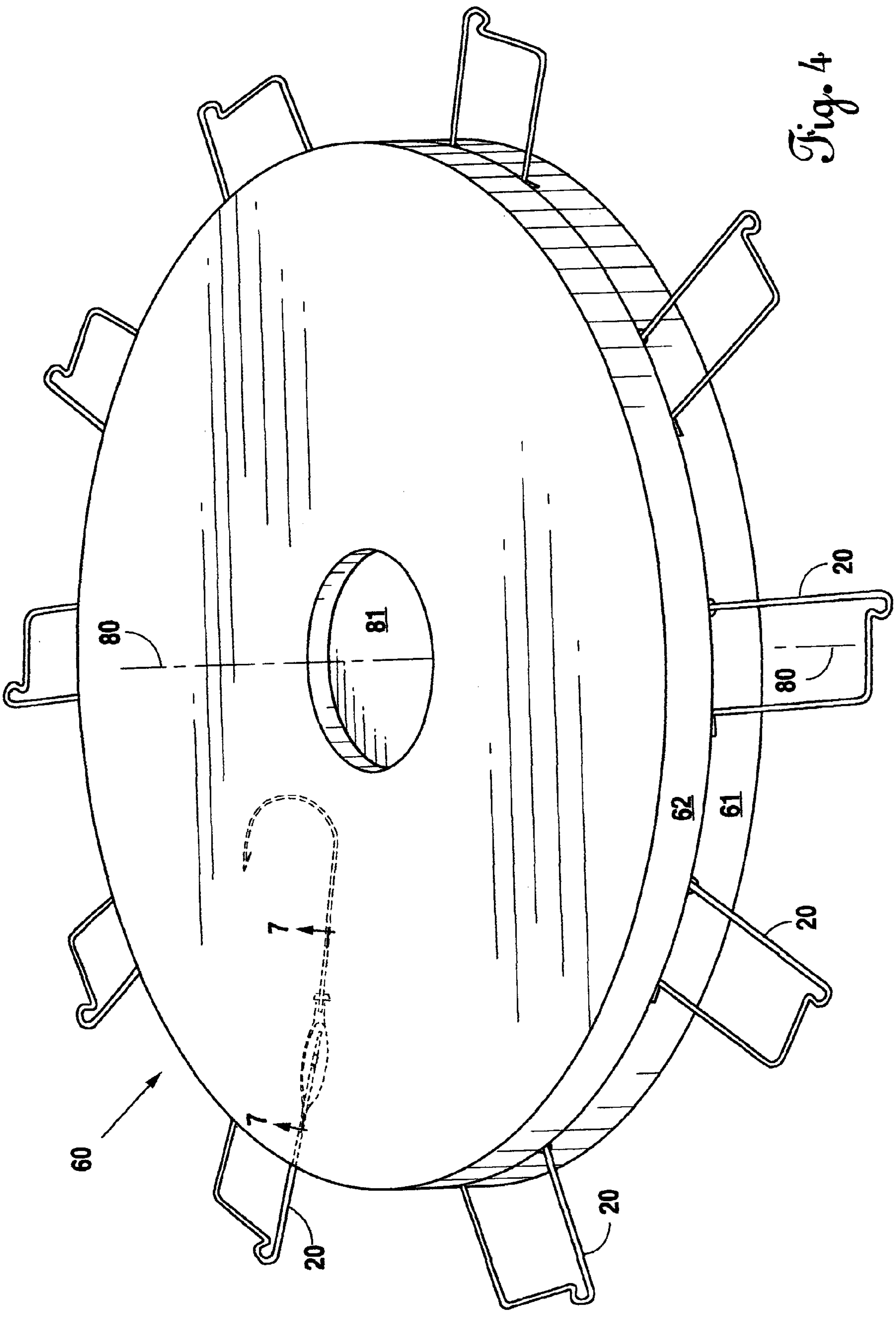
FIG. 4 is a perspective view of the mold forming piece used to manufacture the preferred embodiment.

Referring to FIG. 4, in a preferred process for manufacturing the fishing lure 10 described herein, a plurality of fishing lures are cast in a silicone mold forming piece 60 in a manner common in the industry. The mold forming piece 60 is divided into a lower portion 61 and an upper portion 62.

Figure 5:
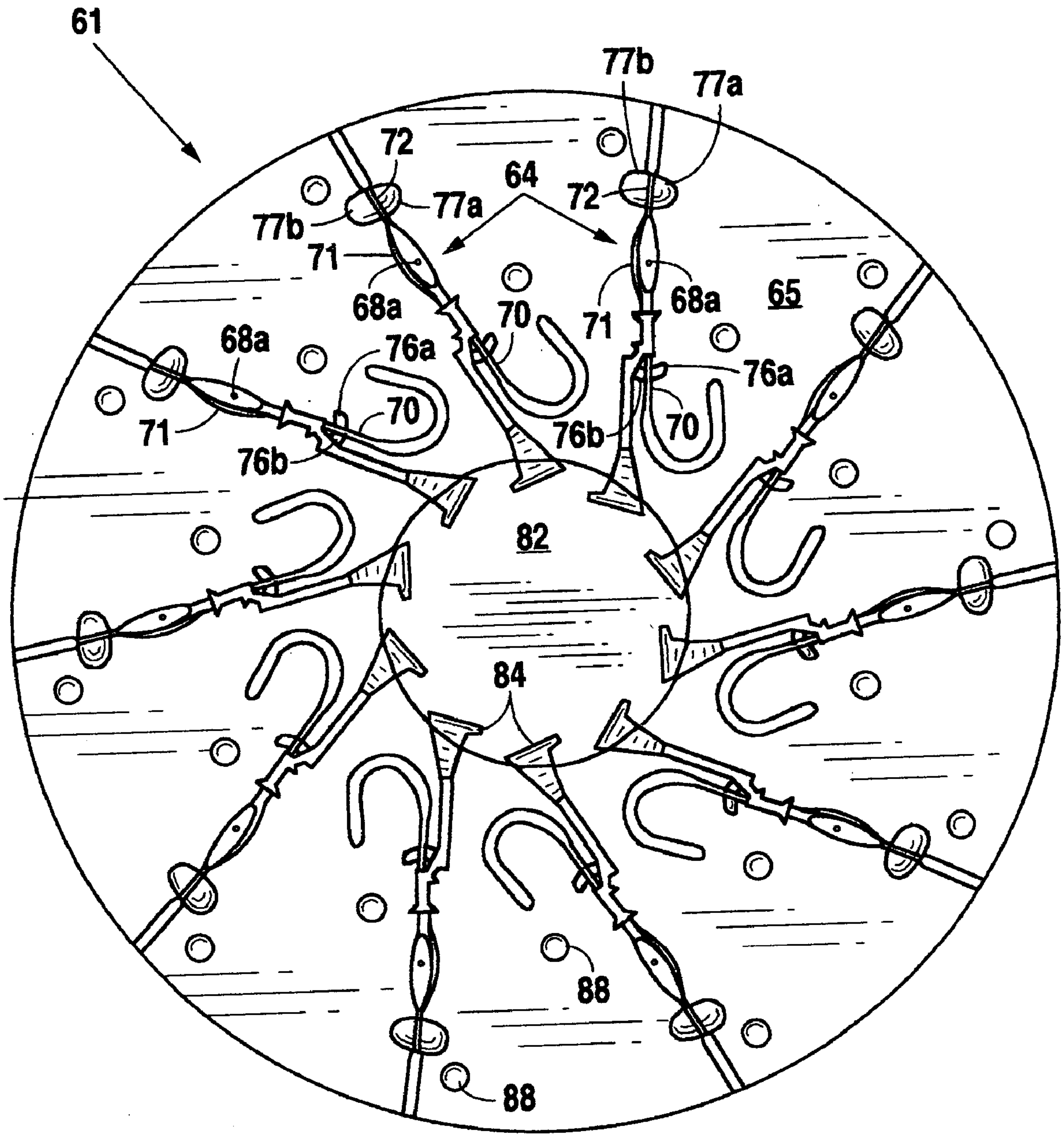
FIG. 5 is a top view of the lower portion of the mold forming piece used to manufacture the preferred embodiment.

Referring to FIG. 5, a plurality of individual lower mold impressions 64 in the shape of the right half of the fishing lure 10 are formed into the top surface 65 of the lower portion 61 of the mold forming piece 60. The lower mold impressions 64 comprise lower lure body impressions 71, lower hook impressions 70, and lower shank impressions 72; which are positioned to correspond to the positions of the hook 40, body 12, and shank 20 of the fishing lure 10 as shown and described herein (See FIG. 1).

Figure 6:
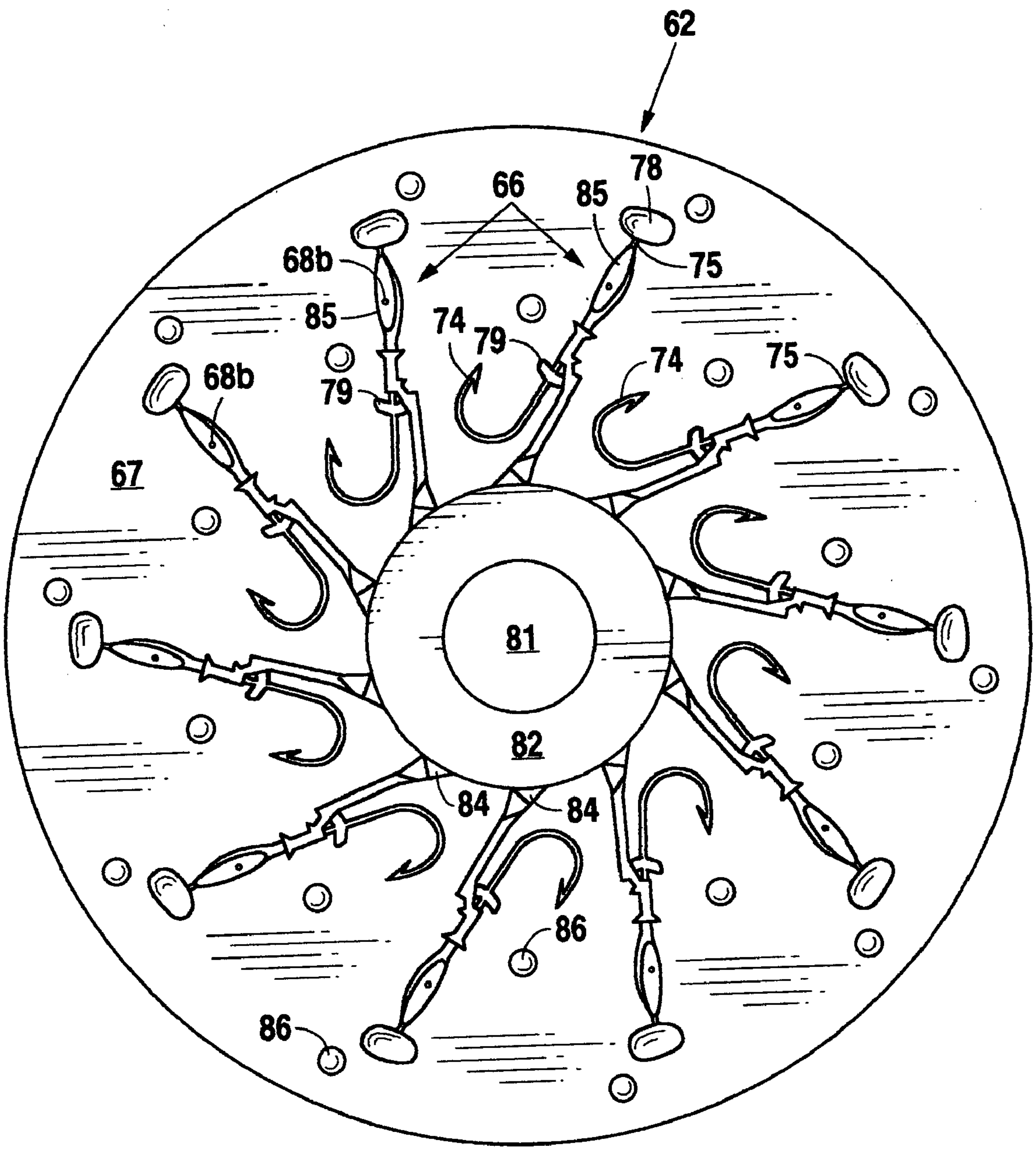
FIG. 6 is a bottom view of the upper portion of the mold forming piece used to manufacture the preferred embodiment.

Referring to FIG. 6, a plurality of individual upper mold impressions 66 in the shape of the left half of the fishing lure 10 (See FIG. 1) are formed into the bottom surface 67 of the upper portion 62 of the mold forming piece 60. The upper mold impressions 66 comprise upper lure body impressions 85, upper hook impressions 74, and upper shank impressions 75; which are positioned to correspond to the positions of the hook 40, body 12, and shank 20 on the fishing lure 10 as shown and described herein (See FIG. 1).

Figure 7:
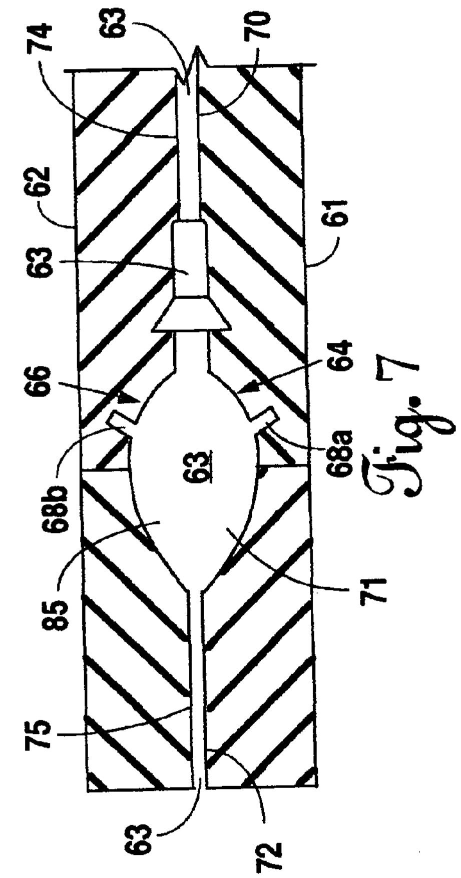
FIG. 7 is a cross section view of a mold cavity along lines 7—7 in FIG. 4.

As shown in FIG. 7, when the upper portion 62 of the mold forming piece 60 is placed on top of the lower portion 61, the plurality of lower mold impressions 64 mate with the corresponding plurality of upper mold impressions 66 forming a plurality of mold cavities 63 in the shape of the fishing lure 10. FIG. 7 shows only a cross section of a single mold cavity 63. However, it can be appreciated that a plurality of identical mold cavities 63 are formed.

Figure 8:
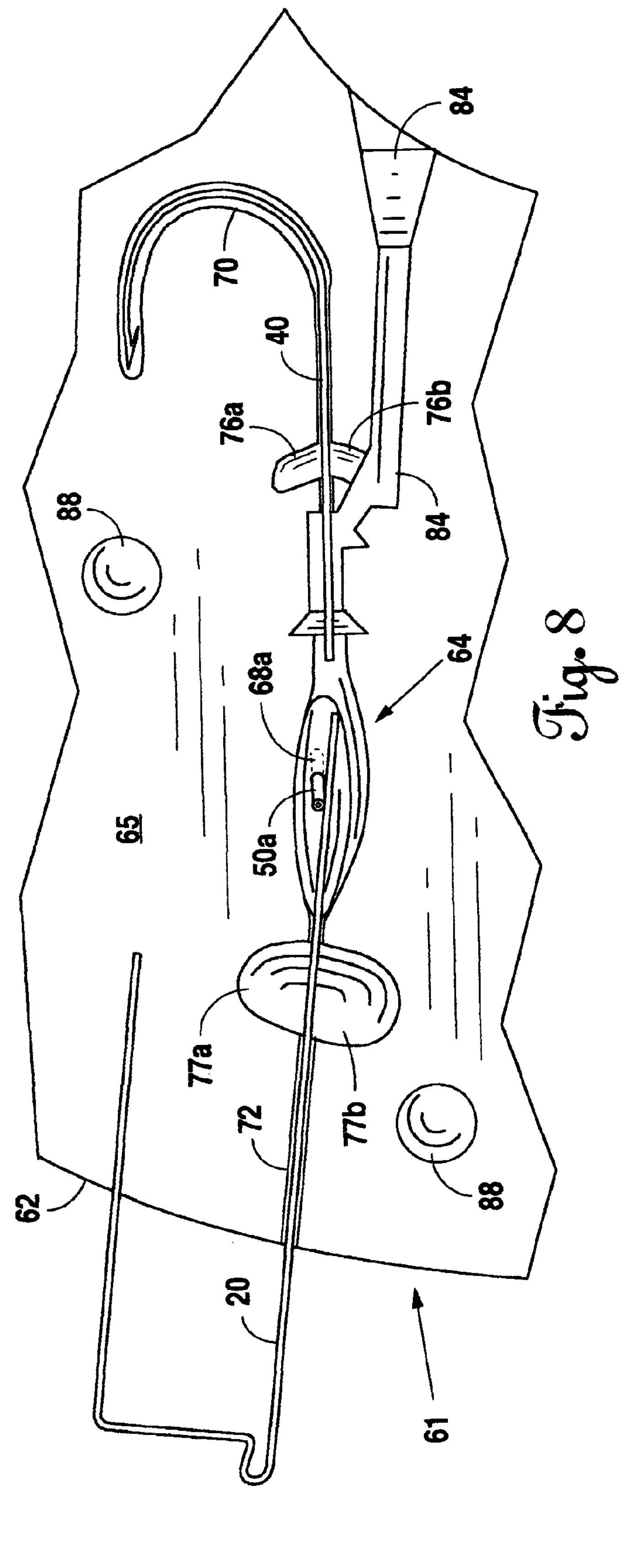
FIG. 8 is an enlarged partial top view of the lower portion of the mold forming piece used to manufacture the preferred embodiment depicting a mold impression of the lure body with hook and shank in place.

Referring to FIGS. 5–8, each of the lower mold impressions 64 and upper mold impressions 66 have respective sleeve impressions 68*a* and 68*b* that correspond to the positions of the connector sleeves 50*a* and 50*b* on the fishing lure 10 (See FIGS. 1, 2). As shown in FIG. 8, prior to placing the upper portion 62 of the mold forming piece 60 on the lower portion 61, connector sleeves 50*a* and 50*b* are inserted into and extend out of the sleeve impressions 68*a* and 68*b*. (FIG. 8 shows only the lower mold impression and, consequently, connector sleeve 50*b* and sleeve impression 68*b* corresponding to the upper mold impression are not shown.) At the same time, a plurality of hooks 40 and shanks 20 are placed in respective lower hook impressions 70 and lower shank impressions 72. When the upper portion 62 of the mold forming piece 60 is then placed on top of the lower portion 61, the hooks 40 and shanks 20 press into respective upper hook impressions 74 and upper shank impressions 75. The hooks 40, shanks 20, and connector sleeves 50 are held in position in this manner during the preferred manufacturing process. FIG. 8 depicts only one of a plurality of lower mold impressions 64.

Referring to FIGS. 5, 6, and 8, first and second protrusions 76*a* and 76*b* and third and fourth protrusions 77*a* and 77*b* extend from the top surface 65 of the lower portion 61 of the mold forming piece 60. First and second protrusions 76*a* and 76*b* are positioned at each side of each lower hook impression 70 and third and fourth protrusions 77*a* and 77*b* are positioned at each side of the lower shank impression 72. The first and second protrusions 76*a* and 76*b* and third and fourth protrusions 77*a* and 77*b* serve to align and further secure the plurality of hooks 40 and shanks 20 when they are placed in the respective hook impressions 70 and shank impressions 72. Corresponding first and second recesses 78 and 79 are formed in the bottom surface 67 of the upper portion 62 of the mold forming piece 60. The first and second recesses 78 and 79 are positioned to accept the first and second protrusions 76*a* and 76*b* and third and fourth protrusions 77*a* and 77*b*, respectively, when the upper portion 62 of the mold forming piece 60 is placed on top of the lower portion 61.

Referring to FIGS. 4–8, once the hooks 40, shanks 20, and connector sleeves 50*a*, 50*b* are placed into the mold forming piece 60, the upper portion 62 of the mold forming piece 60 is then placed on top of the lower portion 61, as shown in FIG. 4. The mold forming piece 60 is then placed in a centrifugal device (not shown) and spun about its axis 80. A plurality of round headed screws 86 are screwed into and protrude from the bottom surface 67 of the upper portions 62 of the mold forming piece 60 (See FIG. 6). A plurality of corresponding screw head cavities 88 are position in the surface 65 of the lower portion 61 of the mold forming piece 60 to receive and mate with the round headed screws 86. The mating of the round headed screws 86 and the screw head cavities 88 allow the upper portion 62 and the lower portion 61 of the mold forming piece 60 to remain in the same position relative to each other during the spinning process.

Still referring to FIGS. 4–8, while the mold forming piece 60 is spinning, molten lead (not shown) is poured through a circular opening 81 centered in the upper portion 62 into a circular cavity 82 formed in the upper portion 62 and lower portion 61. As the molten lead (not shown) is poured into the circular cavity 82, it is slung into the plurality of mold cavities 63 through a plurality of channels 84 that extend from the circular cavity 82 to each mold cavity 63. After the mold cavities 63 are filled, the spinning is stopped and the lead is allowed to cool and harden within the mold cavity 63. Once hardened, the lead bodies 12 are removed from the mold cavities 63 with the hooks 40, shanks 20, and connector sleeves 50 imbedded in and extending from the body 12 of the fishing lure 10 in the manner described herein (See FIGS. 1, 2).

Figure 3A:
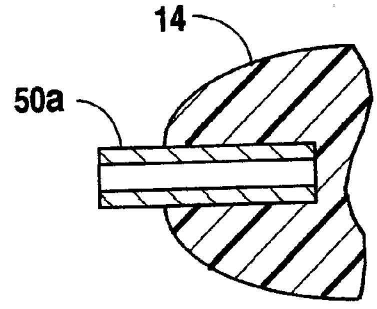
FIG. 3A is a cross sectional view of the preferred embodiment along line 3A—3A in the direction of the arrows in FIG. 2.
Figure 3B:
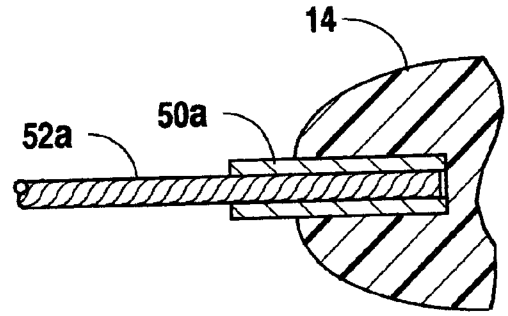
FIG. 3B is a cross sectional view of the preferred embodiment along line 3B—3B in the direction of the arrows in FIG. 2.
Figure 3C:
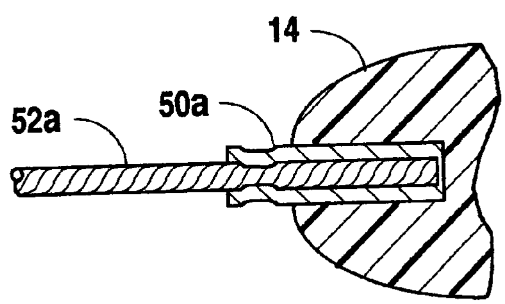
FIG. 3C is a cross sectional view of the preferred embodiment along line 3C—3C in the direction of the arrows in FIG. 2.

As shown in FIGS. 3A–3C, arm 52*a* is then inserted into connector sleeve 50*a*. Sleeve 50*a* is then crimped and pressed into the arm 52*a* thereby holding it in place. FIGS. 3A–3C depict the cross-section of only one side of the head portion of the lure body 12 and thus depict one arm 50*a* and connector sleeve 52*a*. However, it can be appreciated that each fishing lure 10 has an identical and opposing arm 50*b* and connector sleeve 52*b*, which are connected in the identical manner.

Finally, the skirt 44, swivels 55*a* and 55*b*, spinner blades 54*a* and 54*b*, and propeller blade 32 are attached in the manner described herein.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A fishing lure comprising:
- a body;
- a hook secured to said body;
- first and second openings extending into said body and being positioned on opposite sides of said body;
- first and second sleeves secured in said first and second openings respectively wherein said sleeves extend from said body; and
- first and second elongated arms inserted and secured within said first and second sleeves respectively and said elongated arms extending outwardly and backwardly from said body wherein said sleeves are crimped to secure said elongated arms within said sleeves.

2. A fishing lure as recited in claim 1 wherein said elongated arms are flexible.

3. A fishing lure as recited in claim 2 further comprising at least one spinning element swivelly connected to a distal end of at least one of said first and second elongated arms.

4. A fishing lure as recited in claim 3 further comprising:
- a wire shank extending into and from said body;
- a spinning element swivelly connected to distal end of said wire shank.

5. A fishing lure as recited in claim 4 wherein said body is lead and has a wider head portion and a narrower tail portion.

6. A fishing lure as recited in claim 5 further comprising a skirt attached to said tail portion.

7. A fishing lure as recited in claim 1 or 2, wherein said elongated arms are wire.

8. A fishing lure comprising:

a body;

a hook secured to said body;

first and second openings extending into said body and being positioned on opposite sides of said body;

first and second sleeves secured within said first and second openings respectively and said sleeves extending from said body;

first and second wire arms secured within said first and second sleeves respectively and said arms extending outwardly and backwardly from said body wherein said sleeves are crimped to secure said wire arms.

9. A fishing lure as recited in claim 8 wherein said wire arms are is flexible cable wire.

* * * * *